United States Patent [19]

Harrington

[11] Patent Number: 5,084,899
[45] Date of Patent: Jan. 28, 1992

[54] SIGNAL SUPPRESSORS

[75] Inventor: David Harrington, Emsworth, England

[73] Assignee: Siemens Plessey Electronic Systems Limited, Chessington, England

[21] Appl. No.: 213,170

[22] Filed: Nov. 28, 1980

[30] Foreign Application Priority Data

Dec. 1, 1979 [GB] United Kingdom ........... 7941546

[51] Int. Cl.$^5$ ................................. H04L 9/00
[52] U.S. Cl. ........................................... 375/1
[58] Field of Search ................ 375/1, 211, 212; 455/26–30, 278, 296; 343/100 LE, 100 CL, 703; 342/368

[56] References Cited

U.S. PATENT DOCUMENTS

| | | | |
|---|---|---|---|
| 3,747,100 | 7/1973 | Gulick, Jr. | 343/100 LE |
| 3,906,411 | 9/1975 | Lind et al. | 343/703 |
| 4,057,802 | 11/1977 | Pollinger | 343/100 LE |
| 4,097,866 | 6/1978 | Frost et al. | 455/278 |
| 4,105,977 | 8/1978 | Fitting et al. | 455/278 |
| 4,152,702 | 5/1979 | Piesinger | 375/1 |
| 4,156,877 | 5/1979 | Piesinger | 375/1 |
| 4,298,871 | 11/1981 | Kennedy et al. | 342/368 |
| 4,363,138 | 12/1982 | Franklin et al. | 455/296 |
| 4,538,280 | 8/1985 | Mosley, Jr. et al. | 375/1 |

*Primary Examiner*—Salvatore Cangialosi
*Attorney, Agent, or Firm*—Fleit, Jacobson, Cohn, Price, Holman & Stern

[57] ABSTRACT

An interference suppressor comprises an amplitude limiter (2) to which a received signal is coupled. The limiter (2) is effective, when a dominant interfering signal (f1) is present together with a wanted signal (f1), to further increase the amplitude difference between interfering and wanted signals.

A signal combiner (12) is fed with the received signal and also with a signal derived from the limiter (2) via a controlled attenuator (9) and which signal is arranged as to be in phase opposition to the received signal. A phase sensitive detector (8) is responsive to the output signal from the suppressor, which is provided by the signal combiner (12), and to the signal derived from the limiter (2) for providing a control signal for the attenuator (9). The control signal is effective to reduce the amplitude of the interfering signal present in the output signal.

6 Claims, 3 Drawing Sheets

INPUT:
CW SIGNAL +
F.M. CW INTERFERENCE
I/S RATIO 18dB

OUTPUT

SIGNAL SUPPRESSORS

This invention relates to signal suppressors and more especially it relates to interference suppressors.

According to the present invention an interference suppressor comprises amplitude limiter means to which a received signal comprising a wanted signal and a dominant interfering signal is fed so as further to increase the amplitude differential therebetween, signal combiner means fed with the received signal and fed also via a controlled attenuator with a signal derived from the limiter which is in phase opposition to the received signal, and a phase sensitive detector responsive to an output signal from the suppressor provided by the signal combiner means and to the signal derived from the limiter for providing a control signal for the attenuator effective to control the said attenuator so that the amplitude of the interfering signal present in the output signal from the suppressor tends towards zero.

The limiter may be arranged to feed the phase sensitive detector and the controlled attenuator via a band pass filter.

The phase sensitive detector may be coupled to the controlled attenuator via an integrator.

The suppressor may form a part of a spread spectrum communication receiver and it may be included in the input signal path of the receiver prior to the despreader.

One embodiment of the invention will now be described by way of example with reference to the accompanying drawings in which.

Figure 1:
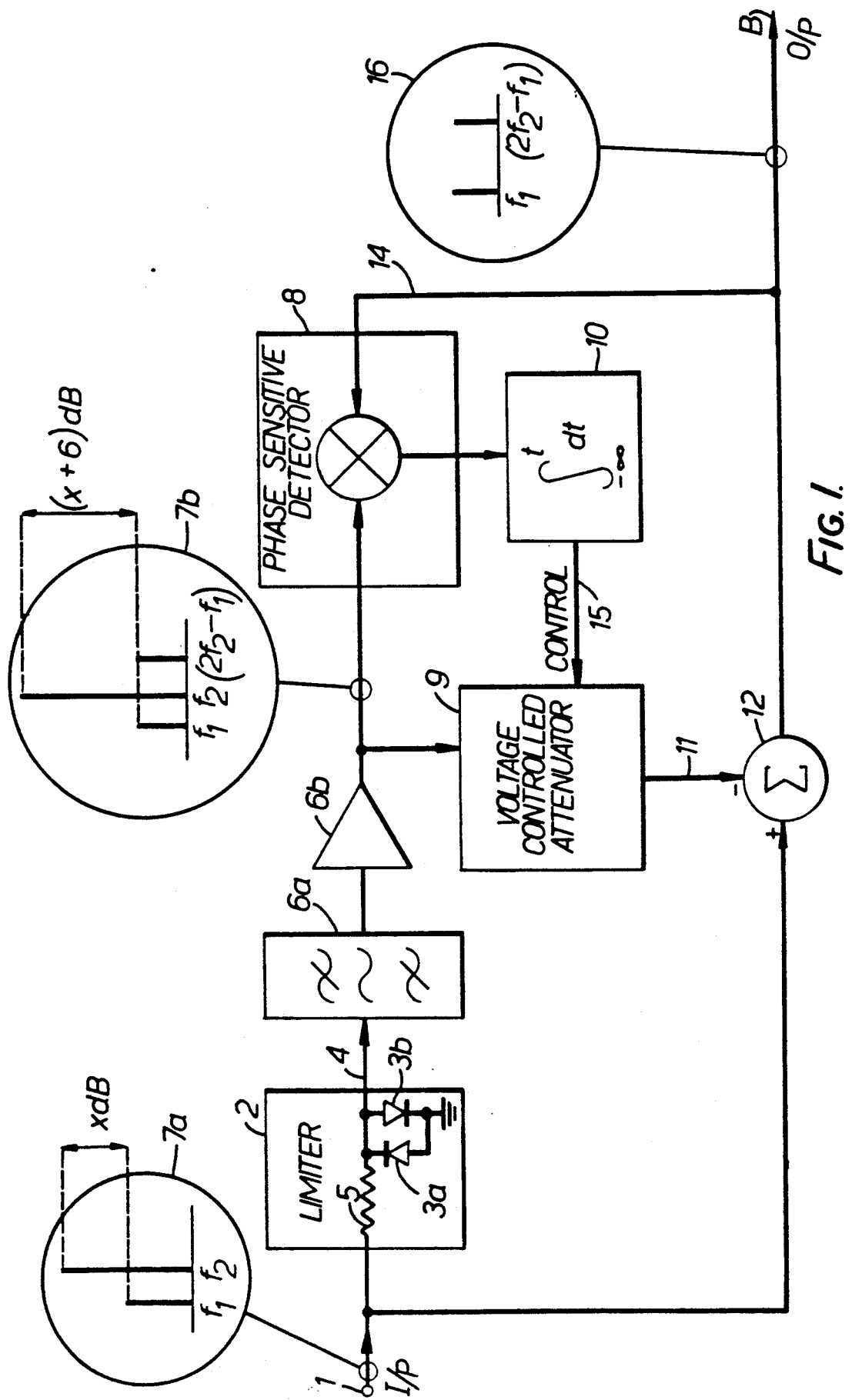
FIG. 1 is a generally schematic block diagram of an interference suppressor.

Referring now to FIG. 1, an interference suppressor comprises an input terminal 1 to which a received signal is fed, the received signal comprising a wanted signal F1 and a dominant unwanted interfering signal F2 which is XdB larger than F1. The received signal is fed to a limiter 2 which in this example comprises a pair of diodes 3a and 3b connected in opposite conduction directions to the signal path 4, the diodes being fed via a resistor 5. The effect of this limiter is to limit all signals fed to the terminal 1 to the forward conduction potential of the diodes; that is to say ±½ volt approximately. Output signals on the line 4 from the limiter 2, are fed to a band pass filter 6a to remove harmonics and it can be shown that with this arrangement the amplitude differential between the wanted signal F1 and the unwanted signal F2 is still further increased as shown by the frequency spectrum diagrams 7a & 7b which show the signal present in the input and output paths respectively of the limiter. This is because of the 'capture' effect of the limiter. Output signals from the band pass filter 6a following the limiter are fed to an amplifier 6b which feeds a phase sensitive detector 8 and a voltage controlled attenuator 9. The phase sensitive detector 8 and the voltage controlled attenuator 9 are connected to define a feed back loop which includes an integrator 10. The voltage controlled attenuator 9 is arranged to feed via a line 11 a signal combiner 12 which is fed also with the received signal applied to terminal 1. The combiner 12 provides an output signal on output terminal 13 and a sample of the output signal is fed back via line 14 to the phase sensitive detector 8. It is arranged that the phase of the signal fed via line 11 to the combiner 12 is in phase opposition to the received signal applied to the terminal 1. Thus it will be appreciated that the feed back loop including the phase sensitive detector 8, the voltage controlled attenuator 9 and the integrator 10 operates so as to provide on a line 15 a control signal for the voltage controlled attenuator 9 which is effective to control the amplitude of the signal fed via line 11 to the combiner 12 so that cancellation of the unwanted signal F2 is effected in the combiner, the loop operating to minimize the amplitude of the unwanted signal F2 on the output terminal 13. It can be shown that the suppressing effect will increase with the degree of dominance of the unwanted interfering signal and so it will be appreciated that the suppressor becomes more valuable as processing gain is increased.

Figure 2A:
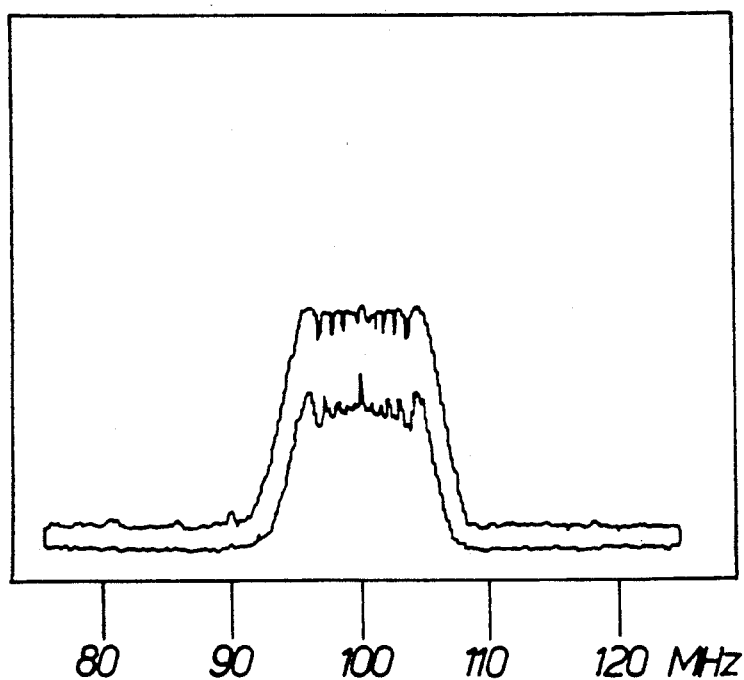
FIG. 2a and FIG. 2b are waveform diagrams showing respectively a signal spectrum before and after cancellation.

Referring now to FIG. 2a the waveform shown indicates the signal spectrum present at the input terminal 1 which comprises a wanted carrier signal at a level of XdB and a frequency modulated carrier wave interference signal 6 dB larger. It will be appreciated that the wanted carrier signal is effectively swamped by the frequency modulated carrier wave interference which has a spectrum which spreads from 90 to 100 megahertz.

Figure 2B:
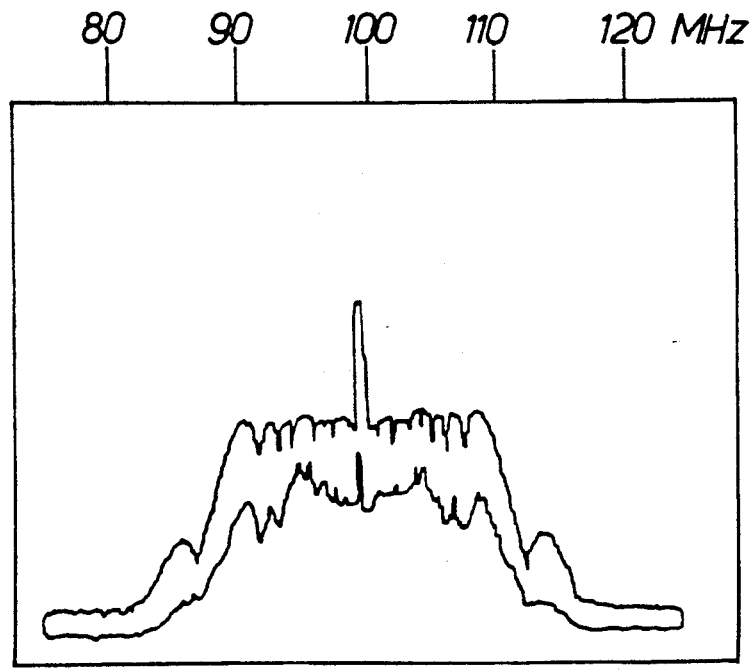

Due to operation of the suppressor as shown in FIG. 1 an output signal as shown in FIG. 2b is present on the output terminal 13 wherein the enhanced wanted carrier signal is centred on a frequency of 100 megahertz at much greater amplitude than the frequency modulated carrier wave interference. In the example shown, the interference/wanted signal ratio X, is 18 dB. With this interference/wanted signal ratio, the cancellation loop including the components 8, 9, and 10 works quite well and good suppression is achieved so as to enhance the wanted signal as shown in FIG. 2b wherein the wanted signal is at least 6 dB larger than the interference. If suppression is imperfect then naturally some of the unwanted signal will appear at the output terminal 13. Under conditions where the relative amplitude of the wanted and the unwanted signal are nearly the same, additional frequency components appear at the output terminal 13 comprising (3F2 - 2F1) (2F1 - F2) and (3F1 - 2F2) for example. Various modifications may be made to the arrangement shown without departing from the scope of the invention and for example the combiner 12 may take the form of a bridge circuit, the balance of the bridge being adjusted so that the band pass filter 6a is not strictly necessary. Although a diode limiter 2 is shown, other form of limiter are known as will be appreciated by those skilled in the art.

Figure 3:
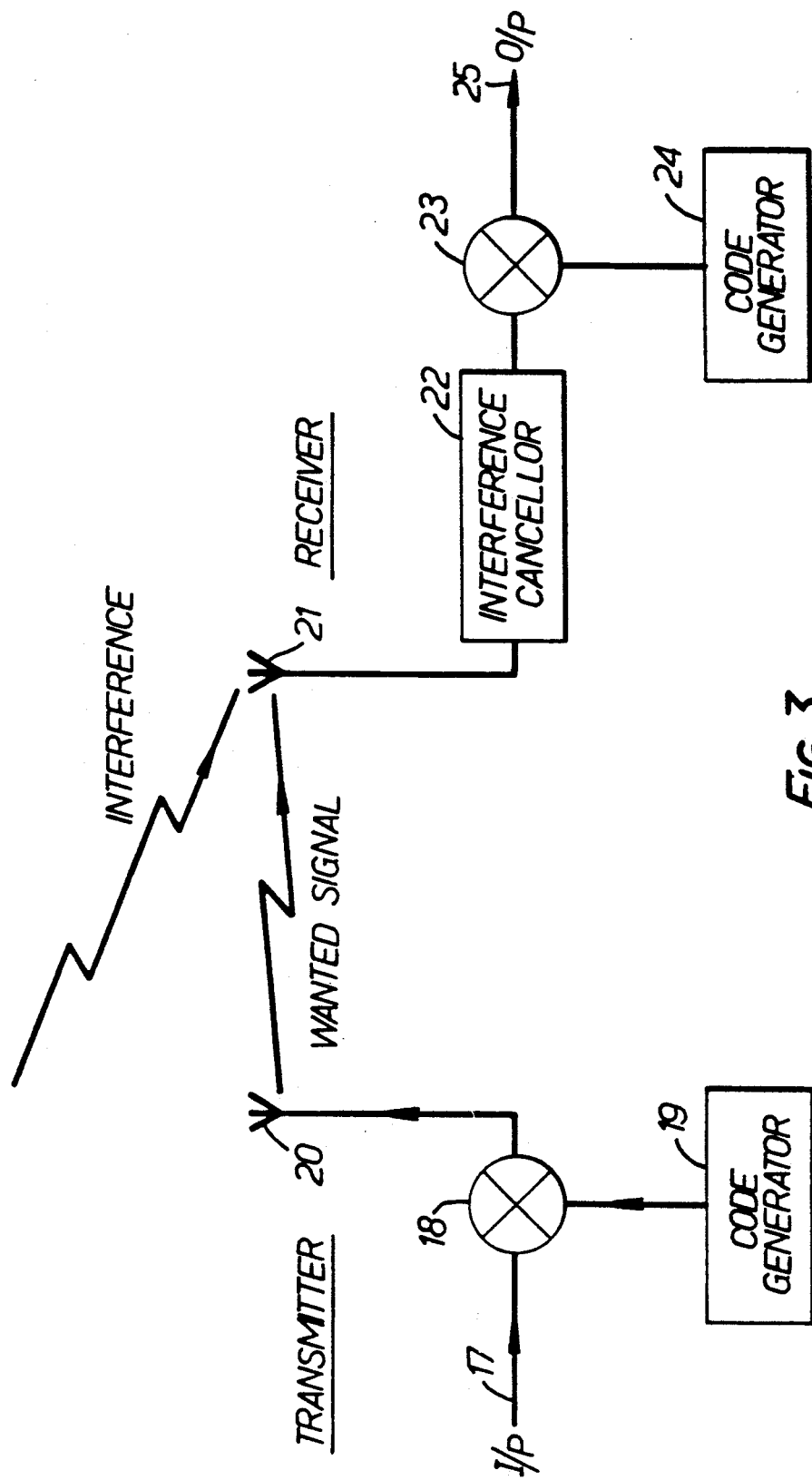
FIG. 3 is a generally schematic block diagram showing an interference suppressor according to the present invention as utilized in a spread spectrum communication system.

It is envisaged that an interference suppressor according to the present invention could be used in a spread spectrum communication system as shown in FIG. 3. Such a system comprises a transmitter the output signal from which is applied on a line 17 to a spectrum spreader comprising a multiplicative mixer 18, to which a signal for transmission is fed and a binary signal code generator 19, the spread signal being fed from the mixer 18 to a transmission aerial 20. Spread spectrum signals are received by the receiver aerial 21 of a complimentary receiver and then fed via a interference suppressor 22 according to the present invention, to a despreading arrangement comprising a multiplier 23 and a code generator 24. The manner of operation of spread spectrum communication systems is well known and it will be appreciated that the code generators 19 and 24 are required to operate synchronously to generate an identical code whereby despreading of the transmitted signal is facilitated in the receiver so as to provide an output signal from the receiver on line 25 corresponding to the input signal on line 17 in the transmitter.

By utilizing, in a spread spectrum communication system, an interference suppressor according to the present invention, a system is provided which will operate satisfactorily in the presence of powerful interfering signals which would otherwise be intolerable.

I claim:

1. An interference suppressor, comprising amplitude limiter means to which a received signal comprising a wanted signal and a dominant interfering signal is fed so as further to increase the amplitude differential therebetween, signal combiner means fed with the received signal and fed also via a controlled attenuator with a signal derived from the limiter which is in phase opposition to the received signal, and a phase sensitive detector responsive to an output signal from the suppressor provided by the signal combiner means and to the signal derived from the limiter for providing a control signal for the attenuator effective to control the said attenuator so that the amplitude of the interfering signal present in the output signal from the suppressor tends towards zero.

2. An interference suppressor as claimed in claim 1, including an integrator connected in circuit between the phase sensitive detector and the controlled attenuator.

3. An interference suppressor as claimed in claim 1 or 2, including a band pass filter connected in circuit between the limiter the phase sensitive detector and the controlled attenuator.

4. An interference suppressor as claimed in claim 1 or 2 or 3, wherein the signal combiner means comprises a bridge circuit operable to cancel additional frequencies produced within the suppressor.

5. A spread spectrum communication system, comprising a transmitter including a spread spectrum signal generating means, and a receiver comprising an interference suppressor as claimed in any one of the preceding claims and signal despreading means.

6. A communication system as claimed in claim 5, wherein the spread spectrum signal generating means comprises a digital code generator, a mixer having a first input for an information signal, a second input coupled with the digital code generator and an output for the spread spectrum signal, and the despreading means comprises means for providing a digital code signal identical to and in synchronism with the signal of said digital code generator and a mixer having a first input for the received signal a second input fed with said identical code signal and an output for a despread received signal.

* * * * *